UNITED STATES PATENT OFFICE.

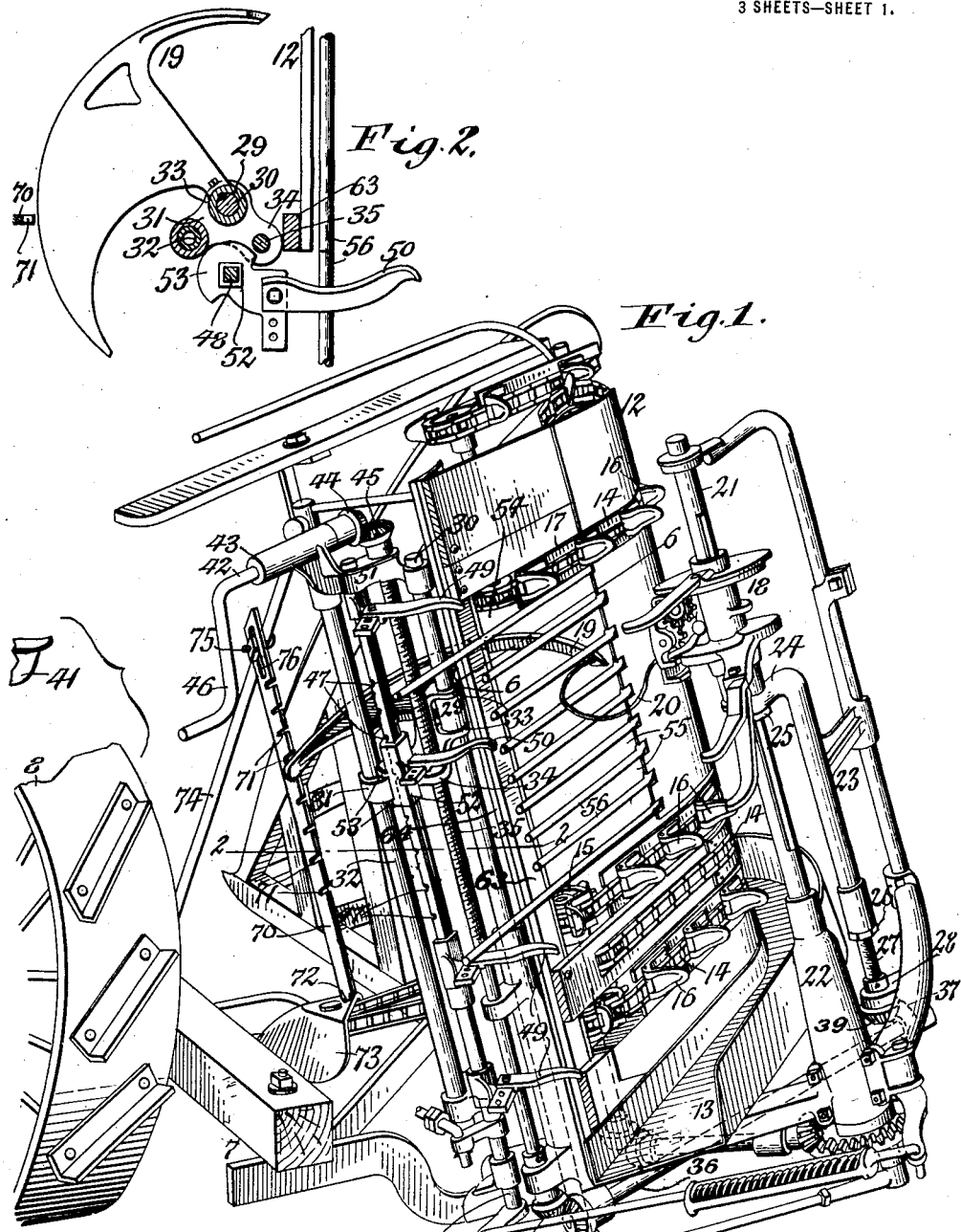

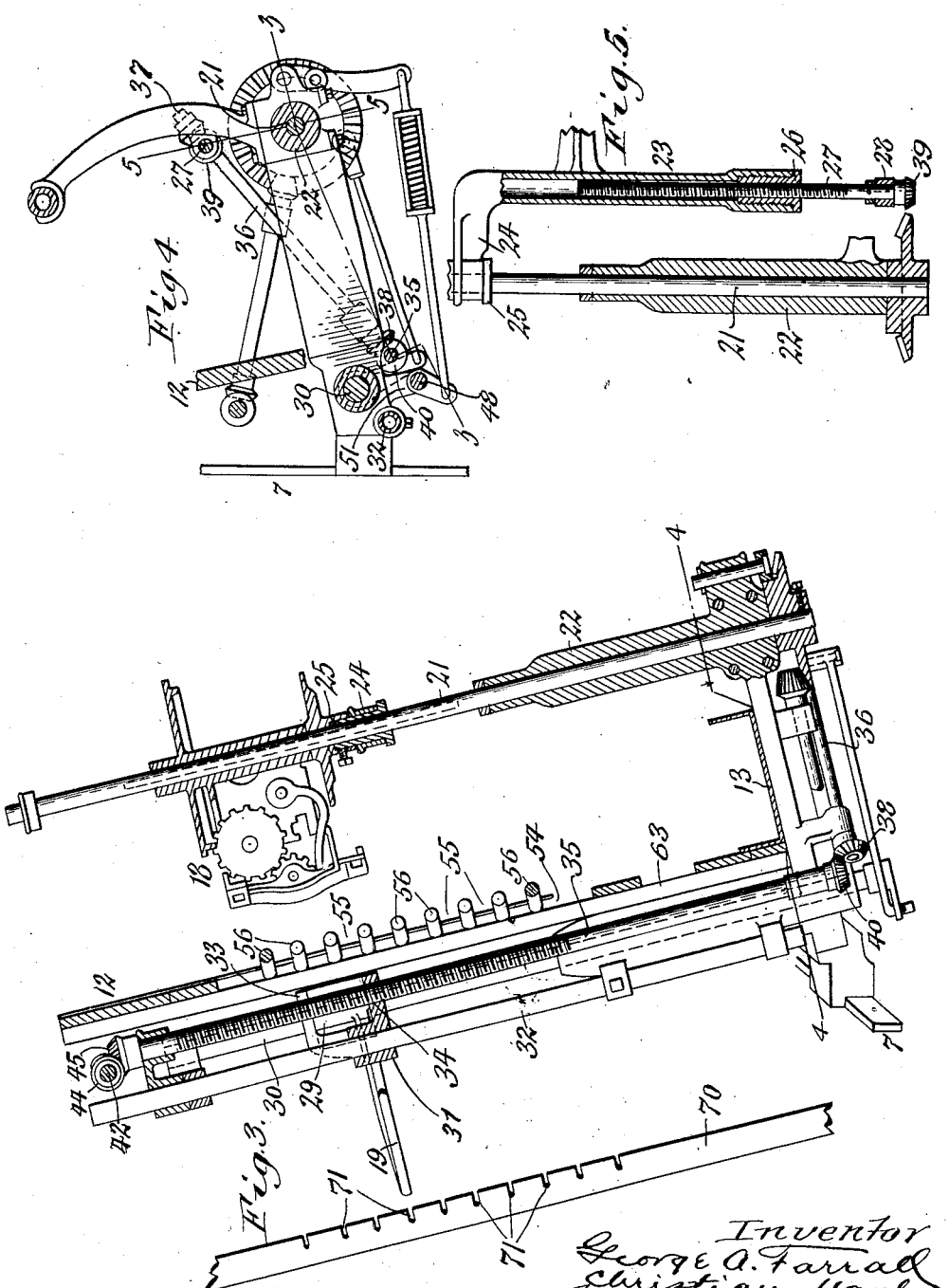

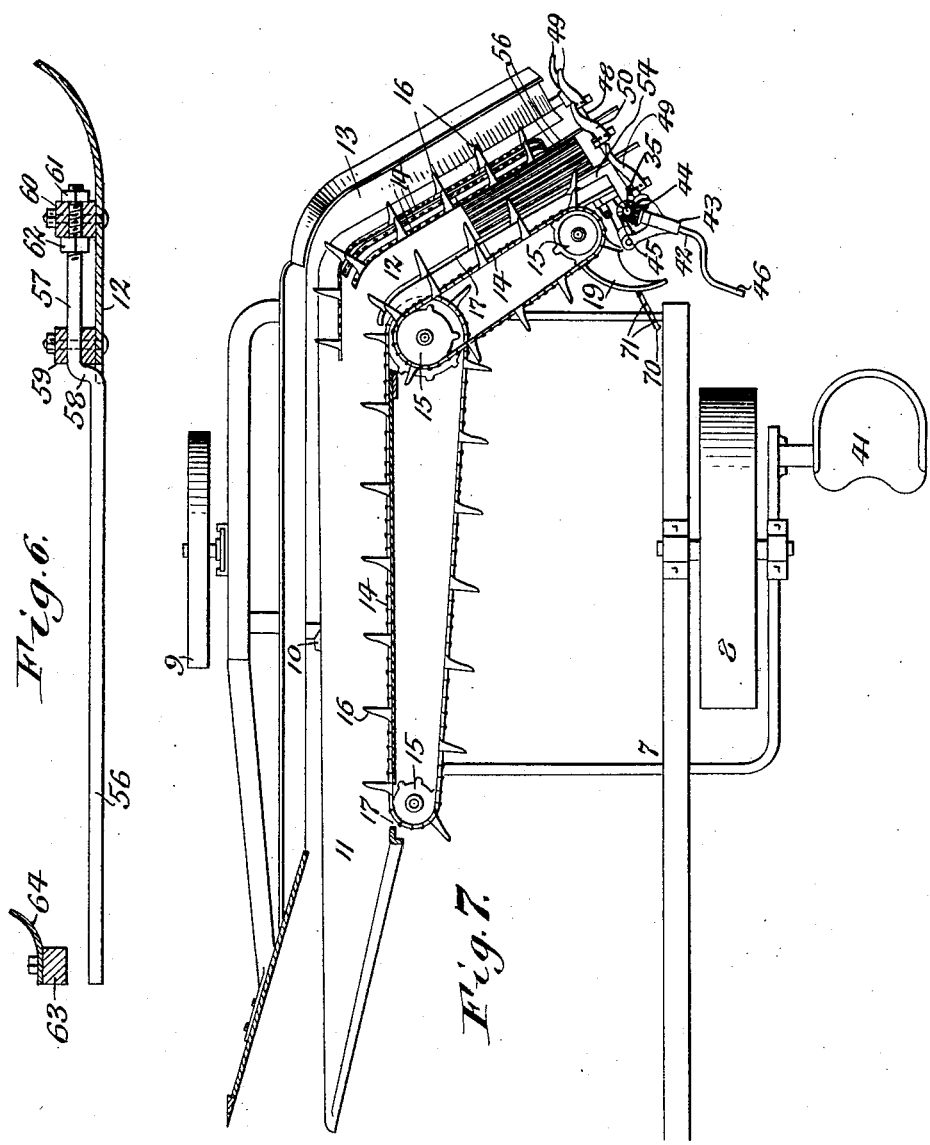

GEORGE A. FARRALL AND CHRISTIAN MAUL, OF BATAVIA, NEW YORK, ASSIGNORS TO MASSEY-HARRIS HARVESTER COMPANY, INC., OF BATAVIA, NEW YORK, A CORPORATION OF NEW YORK.

HARVESTER.

1,389,746. Specification of Letters Patent. Patented Sept. 6, 1921.

Application filed June 10, 1919. Serial No. 303,183.

*To all whom it may concern:*

Be it known that we, GEORGE A. FARRALL and CHRISTIAN MAUL, citizens of the United States, residing in Batavia, in the county of Genesee and State of New York, have invented new and useful Improvements in Harvesters, of which the following is a specification.

This invention relates more particularly to a corn harvester in which the stalks of corn are carried in a substantially upright position from a cutter mechanism rearwardly and laterally to a binder or tying mechanism which latter operates to bind or tie a band or cord around successive bundles of such stalks but this invention is also applicable to other types of harvesters and also to machines for harvesting and bundling other kinds of crops.

In harvesters of this character as heretofore constructed, a binding or tying mechanism was employed which was capable of adjustment transversely of the binding deck in a plane parallel thereto for the purpose of tying the bundles at different distances from their butt ends according to the height of the stalks. In order to permit the needle of this tying mechanism to move across the path of the stalks and coöperate with the knotter in various adjusted positions of these parts to suit the length of the stalks it has heretofore been customary to provide the rear or delivery part of the binder deck with a plurality of longitudinal slots each of which represented a certain tying position for permitting the needle to pass through one or the other of these slots according to the distance at which the bundles were to be tied from their butt ends. These slots terminated short of the rear end of the binder deck and were closed at their rear ends. When shifting the needle transversely of the binder deck for bringing the same in line with one or another of the slots in the deck a loop of the binder twine would be formed around that portion of the deck between one slot and another which necessitated cutting the twine and then re-threading the tying mechanism with the same whenever the needle was shifted from one slot of the deck to another, otherwise the machine would be bound by the twine and parts of the same would be liable to injury or breakage.

Inasmuch as a crop of stalks often varies in height in the same field, the driver of the harvesters as heretofore constructed had to stop the same, leave the seat, cut the twine, re-thread the same and adjust the needle into the required position to suit the height of the crop before proceeding with the harvesting operation all of which involved a loss of time and inconvenience.

One of the objects of this invention is to provide a harvester of this character in which the binder deck adjacent to the tying or binder mechanism is so constructed that the needle of the tying mechanism may be freely adjusted into different positions relative to the binder deck for tying bundles at different distances from the butt ends without requiring cutting of the binder twine and re-threading the tying mechanism.

A further object of this invention is to provide means for adjusting the binder or tying mechanism which are within convenient reach of the operator while occupying the seat on the carriage of the harvester and thus avoid the necessity of dropping the lines of the team which is hauling the harvester and leaving the seat for this purpose.

Another object of this invention is to provide convenient means for enabling the operator to readily determine the position of the tying mechanism with reference to the deck so as to enable the tying of the bundles to be effected at the proper distances from their butt ends without requiring the operator to stop the machine or leave the seat.

In the accompanying drawings:

Figure 1 is a fragmentary perspective view showing a corn harvester from the rear and embodying the preferred form of our invention. Fig. 2 is a fragmentary horizontal section, taken substantially on line 2—2, Fig. 1. Fig. 3 is a fragmentary vertical transverse section of the harvester, taken substantially on line 3—3, Fig. 4. Fig. 4 is a fragmentary horizontal section, taken on line 4—4, Fig. 3. Fig. 5 is a fragmentary longitudinal section of the machine, taken on line 5—5, Fig. 4. Fig. 6 is a fragmentary horizontal section taken on line 6—6, Fig. 1. Fig. 7 is a fragmentary top plan view of the harvester, partly in section.

Similar characters of reference refer to like parts throughout the several views.

Although this invention is applicable to various forms of harvesters for cutting and bundling fodder corn or similar crops that, which is shown in the drawings for example of one suitable for carrying our invention into practical use, comprises a carriage having a main frame 7 which is supported on its opposite sides by means of a master wheel 8 and a grain wheel 9, a cutter mechanism 10 arranged on the front part of the carriage and adapted to sever the stalks of corn or other crop as the machine moves forwardly through the same and a platform or binder deck having a front receiving portion 11 which extends lengthwise of the cutting mechanism and is mounted on the carriage so as to incline toward the stubbleward side of the machine and a rear delivery portion 12 which extends laterally from the rear end of the receiving portion of the deck and inclines both stubbleward and forwardly relative to the machine. As the machine moves forwardly the stalks are cut off by the cutter mechanism and then moved rearwardly in a substantially upright position along the front receiving and rear delivery portions of the binder deck during which time the butt ends of the stalks rest upon and slide over the bottom or lower guide 13 arranged at the lower edge of the deck. This rearward movement of the stalks may be effected by any suitable means but preferably by means of a conveyer comprising a plurality of chain belts 14 arranged in rear of the binder deck and passing around sprocket wheels 15 and provided with feeding wings or fingers 16 which project through longitudinal slots 17 in the binder deck so as to engage the stalks and propel the same rearwardly along the deck from the cutter mechanism to the bundle forming mechanism arranged adjacent to the rear or delivery part of the binder deck.

The bundle tying or binding mechanism which is shown in the drawings as typical of one suitable for this purpose comprises a knotter 18 which is arranged opposite the front side or face of the rear or delivery portion of the binder deck and a needle 19 which is mounted in rear of this portion of the deck and is adapted to swing across the path of the stalks and coöperate with the knotter and pass the twine or band 20 around successive bundles of stalks and secure the ends of the band of each bundle together in the form of a knot, this mechanism being of any suitable and well known construction and similar to that commonly employed in machines of this type.

The knotter is mounted on the upper end of an upright knotter shaft 21 which is arranged parallel with the rear or delivery portion of the deck and is capable of longitudinal adjustment on this shaft but operatively connected therewith so that the latter may be shifted into different positions relatively to the bottom 13 of the binder deck for the purpose of tying bundles of stalks at different distances from their butt ends to suit the length of the same. The lower end of the knotter shaft is journaled in a bearing or knotter standard 22 which forms part of the tier frame and is rotated in the proper direction by any suitable mechanism by motion which is derived from the master wheel.

The means shown in the drawings for effecting the raising and lowering of the knotter mechanism so that the same may be shifted into different positions relative to the width of the binder deck comprise a transversely movable yoke 23 having an arm 24 which embraces the hub or sleeve 25 of the knotter mechanism and an upright screw 27 which is engaged at its upper externally threaded end with a screw nut 26 mounted in the lower tubular part of said yoke while its lower circular part is journaled in a bearing 28 in the adjacent part of the tier frame so that this screw is capable of turning in this bearing but is incapable of moving lengthwise therein. Upon turning the screw 27 in one direction or the other the yoke 23 together with the knotter mechanism is raised or lowered but the driving connection between the working parts of the knotter mechanism and the knotter shaft are not disturbed.

The means for operating the needle are so constructed that the same is capable of being raised and lowered to suit the position of the knotter mechanism and still maintain the driving connection between this needle and its operating mechanism. For this purpose the hub 29 of the needle is splined on the upright needle rock shaft 30 which is arranged transversely in rear of the delivery portion of the binder deck and journaled in suitable bearings on the tier frame and the deck frame so as to be capable of turning but incapable of lengthwise motion. The longitudinal movement of the needle on the needle shaft is effected by means of a needle yoke having a hub 31 which slides on an upright guide rod 32 secured to the tier frame and deck frame parallel with the needle shaft, two shifting collars 33, 33 which receive the needle shaft and engage with the upper and lower ends of the needle hub and a screw nut 34 arranged adjacent to said collars, and a needle adjusting screw 35 arranged in rear of the delivery portion of the binder deck and engaging with the screw nut 34 and journaled at its upper and lower ends in suitable bearings on the deck frame so that the needle adjusting screw is only capable of turning but can not move lengthwise of its axis. By this means a turning motion of the needle adjusting screw screw 35 will cause the needle yoke and the needle to be raised or lowered for adjusting the needle into the desired position transversely of the binder deck. An oscillating motion is imparted to the needle rock shaft by power derived from the master wheel in any suitable manner.

For the purpose of causing the needle and knotter to be raised and lowered in unison so that they are always retained in the proper operative relation when shifting into different positions transversely of the binder deck the knotter adjusting screw and the needle adjusting screw are operatively connected so that they turn together, this being preferably accomplished by means of a transverse coupling shaft 36 arranged underneath the bottom of the deck and journaled in suitable bearings on the tier frame and provided at its opposite ends with bevel gear wheels 37, 38 which mesh with corresponding bevel gear wheels 39, 40 at the lower ends of the knotter and needle adjusting screws, as shown in Figs. 1, 3, 4 and 5.

In order to enable the operator to effect this adjustment of the needle and knotter without dropping the lines of the horses which are hauling the harvester and leaving his seat 41 for this purpose, means are provided which are within reach of the driver while he is occupying the seat. The latter is preferably arranged upon the main frame adjacent to the outside of the master wheel and the mechanism for operating the needle and knotter adjusting mechanism comprises a substantially horizontal operating shaft 42 which is journaled transversely in a suitable bearing 43 on the upper part of the deck frame and provided at its inner end with the bevel gear wheel 44 which meshes with a similar bevel wheel 45 on the upper end of the needle adjusting screw while the outer end of the operating shaft is provided with a crank or handle 46 which is within reach of the operator while occupying the seat 41, as best shown in Fig. 7. The tying mechanism may therefore by this means be adjusted easily and conveniently without loss of time and without requiring the operator to leave his seat or drop the lines, thereby enabling the adjustment of the tying mechanism to be effected at will and while the machine is traveling over the field. Obviously this is a decided advantage inasmuch as this capacity enables the operator to adjust the tying mechanism very quickly and as often as required to suit the different heights of the crop as the harvesting of the same progresses.

It is desirable to enable the operator to determine the position of the tying mechanism relatively to the binder deck and also to shift the tying mechanism to a predetermined position for tying a band around the bundle at the desired distance from the butt end. A suitable indicating means for this purpose consists in placing a longitudinal row of dial marks or indications 47 on the compressor or trip shaft 48 which carries a plurality of trip or compressor arms 49, 50 adjacent to the rear or discharge end of the binder deck. This compressor shaft is arranged parallel with the needle shaft and adjacent thereto and its upper and lower ends are cylindrical and journaled in suitable bearings 51 on the adjacent part of the deck frame while its central part is preferably made square in cross section and provided with indicating marks. The upper and lower compressor arms 49 are fixed to the compressor shaft so as to turn therewith but the intermediate compressor arm 50 is capable not only of turning with this shaft but also sliding lengthwise thereon by providing its hub 52 with a square opening which receives the correspondingly-shaped central part of the compressor shaft. The hub of this sliding compressor arm is provided with a pair of segmental shifting lugs 53, 53 which straddle a part of the needle shifting yoke 31 so that this intermediate compressor arm is capable of rocking with its shaft independently of the needle yoke but is compelled to move lengthwise on its shaft with said yoke at the same time that the needle is moved lengthwise of its shaft. The indicating marks on the compressor shaft are preferably placed thereon in a certain relation to one end of the hub of the intermediate compressor arm preferably the upper end thereof so that when this end of this hub is in line with a particular indicating notch or mark on the compressor shaft the operator will be informed at which particular location the tying mechanism is relative to the bottom of the binder deck without requiring him to leave his seat.

It will be understood that these compressor arms are associated with other mechanism so that when the pressure of the stalks against the same exceeds a predetermined degree the compressor shaft will be turned and set in motion the devices which cause the tying mechanism to effect a cycle of operations.

The rear or delivery portion of the binder deck over which the stalks pass and upon which the same are supported while the tying mechanism is placing a band of twine around the same, or that area of the same which is within the limits of adjustment of the tying mechanism is constructed in the form of a comb which permits the tying mechanism to be freely adjusted for varying the position of the tie on the bundle without necessitating cutting the twine when adjusting the tying mechanism from one position to another and without causing the tie to be bound around parts of the machine and interfere with its free operation. This comb shaped portion of the deck is arranged adjacent to the tying mechanism and extends across an opening 54 in the adjacent portion of the frame of the deck.

In its preferred form this comb comprises a plurality of tines which are arranged lengthwise and parallel with each other across the opening 54 in the form of a vertical row so that several tines are spaced apart from each other by intervening longitudinal slots or spaces 55. Each of these tines is preferably constructed of a resilient rod of steel or other metal which is preferably constructed to form a rear longitudinal tooth 56 which is comparatively long, a front longitudinal tang 57 which is comparatively short and offset laterally relatively to the tooth 56, and a transverse neck 58 connecting the front end of the tooth and the rear end of the tang. This tine is preferably round in cross section although any other suitable form in cross section may be employed if desired. The several teeth of the tines forming the comb portion of the binder deck are preferably arranged flush with the adjacent solid portion of the deck and extend lengthwise of the deck across the opening 54 therein, while the tangs of the several tines are arranged in rear of the adjacent solid or imperforate part of the deck, as shown in Fig. 6, so as not to obstruct the path of the stalks which pass over the same. The several tangs of the tines are supported at their rear ends by passing the front parts of the same through openings in an upright intermediate bar 59 forming part of the deck frame and each tine is held in its proper position by passing its screw threaded front end through an opening formed in an upright intermediate bar 60 of the deck frame and applying clamping screw nuts 61, 62 to the tang and engaging the same respectively with the front and rear sides of the last-mentioned deck bar, as shown in Fig. 6. By this means the front ends of the several tines are fixedly supported while the rear ends of the same are free and unsupported and spaced apart a short distance from the front side or face of an adjacent upright rear bar 63 of the deck frame so that any twine which may be wrapped around the tines can slide freely rearwardly off from the tines and slip off from the rear ends of the same.

When operating the harvester the tying mechanism is so adjusted that its needle is arranged transversely in line with one of the spaces between two adjacent tines of the comb shaped portion of the binder deck so that during a tying operation the needle is free to pass through the respective slot and across the path of the corn stalks to the knotter mechanism for the purpose of tying the twine or band around a bundle of stalks. By adjusting the tying mechanism so as to bring the needle with its point opposite a slot between any two adjacent tines of the vertical row which forms a comb, the band or twine may be tied around the bundles at different distances from the butt ends thereof depending upon the distance which the needle is located from the bottom guide of the binder deck. The adjustment of the tying mechanism is effected while the needle is in its inoperative or retracted position behind or in rear of the supporting comb in order to avoid interference between the needle and the tines. When effecting such adjustment of the tying mechanism so that the needle is shifted from a position in line with a slot between two adjacent tines to a slot between two other tines, that portion of the twine or band 20 whereby the bundles are tied is passed around the tines which are arranged between the former position of the needle and the one to which it has been adjusted so that these intervening tines are embraced by this tie as well as the stalks of the bundle which is being tied at this time. As the bundle after being thus tied continues its movement rearwardly over the rear or delivery portion of the binder deck and is discharged from the rear end thereof that portion of the tie around the bundle which also embraces one or more of the teeth of the several tines slips rearwardly off from these teeth by reason of the fact that the rear ends of these teeth are unattached to any adjacent part of the machine, thereby permitting the bundle together with its tie to completely clear itself of the binder deck without being hindered in its discharge notwithstanding that its tie was temporarily passed around one or more of the tines. It will be obvious from this operation of the comb shaped portion of the binder deck that the same avoids the necessity of cutting the twine between the knotter and the needle of the tying mechanism when adjusting the tying mechanism from one position to another transversely relatively to the plane of the binder deck and that notwithstanding the passing of the tie of the first bundle around one or more of the tines after such adjustment has been effected no serious results or interference with the operation of the machine will occur inasmuch as any tie which temporarily embraces one or more of the tines will simply slip rearwardly off such tines and clear itself wholly from the binder deck without in any way altering the operation of the machine. This capacity of the machine while avoiding the necessity of cutting the tying twine or band upon adjusting the tying mechanism from one position to another, not only saves the driver the trouble of dismounting from the machine and cutting the twine and re-threading the needle but it also enables the operator to run the machine continuously over the field without interruption and to quickly and frequently adjust the tying mechanism for adapting the same to different heights of the crop upon encountering the same when passing over the field. Furthermore, by constructing that portion of the binder deck adjacent to the tying mechanism in the form of a comb a much greater number of slots for the passage of the needle across the path of the stalks is provided and thereby permits of placing the tying twine or band much nearer to the best place around the bundle where the tying of the same is most effective according to the length of the stalks of the respective bundles which is not possible in a machine where only a few slots are provided in the binder deck for the passage of the needle and therefore only permits of placing the twine around the bundles in most cases in approximately the best position. By constructing the tines of metal round in cross section, interference between the needle and these tines is rendered practically impossible inasmuch as the needle when effecting its forward or operative stroke will upon accidentally engaging a tine, due to imperfect adjustment of the tying mechanism, simply deflect the tooth of the tine to one side without causing any breakage or interfering with the tying operation of the machine. Interference of the needle with one or another tine of the comb portion of the binder deck may however, be prevented by the operator leaving the tying mechanism in such adjusted position that the upper end of the intermediate presser arm is in line with one of the dial notches on the compressor shaft which insures keeping the needle in line with one or another of the spaces or slots between the several tines of the comb and avoids interference between these parts during the tying operation.

In order to avoid any part of the stalks which may project backward through the spaces between the several teeth of the tines from becoming caught on the rearmost upright bar 63 of the deck frame which is arranged adjacent to the unattached ends of the tines, a deflector 64, preferably curved, is secured to this deck bar so as to project forwardly from this bar and laterally away from the face of the deck, as shown in Fig. 6, thereby preventing any particles of stalks from becoming wrapped around this bar and clogging the machine.

If desired the upper and lowermost tines of the comb-shaped part of the binder deck may extend rearwardly a considerable distance beyond the opening 54 in the deck so as to form a reliable support for the bundles and secure a clear delivery of the same from the rear end of the machine to the ground, but the intermediate tines are shorter and terminate at their rear ends in front of the path of adjustment of the intermediate compressor arm so as to permit the latter to be freely adjusted up and down to suit the length of the stalks which are being bundled.

Another form of index or indicating means for this purpose consists in arranging an index bar 70 parallel with the needle shaft and adjacent to the path of the needle so that the latter sweeps with its outer edge close to this index bar. The latter is provided on its rear upright edge with index notches or indicating notches 71 which correspond to the spaces between the tines of the comb shaped portion of the binder deck so that when the needle is in line with one or another of these notches the operator knows that the needle will pass through the space between certain predetermined tines, thus enabling the machine to be set readily and properly for binding bundles at a certain distance from the butt ends thereof. The index bar is preferably mounted by providing its lower end with a tenon 72 which engages with an opening in an adjacent gear cover 73 and its upper end is connected with an adjacent brace 74 of the main frame by a hook bolt 75 which passes through a longitudinal slot 76 in the index bar, as shown in Fig. 1. By this means the index bar may be accurately adjusted so that its indicating marks or notches correspond to the spaces between the tines and enable the operator to merely observe the position of the needle relatively to these marks for ascertaining the position of the needle to the comb shaped portion of the deck while he is occupying the seat and thus avoids the necessity of dropping the lines of the team or leaving the machine for this purpose.

We claim as our invention:

1. A harvester comprising a binder deck the rear end or delivery portion of which has the form of a plurality of spaced longitudinal tines which are fixed only at their front ends while their rear ends are free, and a tying mechanism including a knotter arranged in front of said tines and a needle coöperating with said knotter and mounted in rear of said tines and movable transversely and perpendicular to the plane of said deck.

2. A harvester comprising a binder deck the rear end or delivery portion of which includes a frame and a plurality of longitudinal tines which are arranged parallel and separated from each other by intervening spaces, each of said tines having a main rear tooth which is free at its rear end, a front tang which is off-set from said tooth and secured to said frame, and a transverse neck connecting the rear end of said tang with the front end of said tooth.

3. A harvester comprising a binder deck, the rear end or delivery portion of which includes a frame and a plurality of longitudinal tines which are arranged parallel and separated from each other by intervening spaces, each of said tines having a main rear tooth which is free at its rear end, a front tang which is off-set from said tooth, and a transverse neck connecting the front end of said tooth with the rear end of said tang, said frame being provided with openings which receive said tangs, and each of said tangs having screw nuts which engage against opposite sides of a portion of said frame.

4. A harvester comprising a binder deck having its delivery part constructed in the form of a comb the tines or teeth of which are arranged lengthwise of the deck and each supported at its front end while its rear end is unsupported, a tying mechanism arranged adjacent to said comb and having a needle movable through the spaces between the tines thereof, means for adjusting said tying mechanism transversely and parallel with the plane of said comb, and an index bar arranged adjacent to the path of said needle and provided with a row of indicating marks arranged lengthwise of the axis of the needle and corresponding to the spaces between said tines to permit of determining the position of the needle relatively thereto.

5. A harvester comprising a carriage, a binder deck mounted on the carriage, a tying mechanism including a knotter arranged in front of the deck and a needle mounted in rear of the same and both adjustable transversely and in a plane parallel with the deck, a driver's seat mounted on the carriage, and means for adjusting the needle and knotter including a rear adjusting screw operatively associated with said knotter, a front adjusting screw operatively associated with said needle, a cross shaft connected by gearing with the adjusting screws, and a crank shaft connected by gearing with said front screw and having a handle within reach of said seat.

6. A harvester comprising a binder deck having its rear or delivery part constructed in the form of a comb the tines of which are arranged lengthwise of the deck and are supported at their front ends while their rear ends are free or unattached and the uppermost and lowermost tines of the comb being comparatively long while the intermediate tines are shorter and terminate at a distance in front of the rear ends of said uppermost and lowermost tines, and a tying mechanism having a knotter arranged opposite the face of said comb and a needle which is supported in rear of said comb and is movable through the spaces between said tines and coöperates with said knotter.

7. A harvester comprising a binder deck having its rear or delivery part constructed in the form of a comb the tines of which are arranged lengthwise of the deck and are supported at their front ends while their rear ends are free or unattached and the uppermost and lowermost tines of the comb being comparatively long while the intermediate tines are shorter and terminate at a distance in front of the rear ends of said uppermost and lowermost tines, a tying mechanism having a knotter arranged opposite the face of said comb and a needle which is supported in rear of said comb and is movable through the spaces between said tines and coöperates with said knotter, and a compressor mechanism having a rock shaft arranged in rear of said long tines, non-adjustable compressor arms arranged on said shaft above and below said uppermost and lowermost tines, and an adjustable compressor arm arranged in rear of said intermediate tines and between said uppermost and lowermost tines and adjustable lengthwise on said shaft.

8. A harvester comprising a binder deck having an opening in its rear or delivery part, and a comb shaped portion extending over said opening and composed of tines which are supported at their front ends and are free at their rear ends, a tying mechanism arranged adjacent to said comb, and a guard arranged at the rear edge of said opening.

9. A harvester comprising a binder deck having an opening in its rear or delivery part, a frame provided with a bar at the rear edge of said opening, and a comb shaped portion extending over said opening and bar and composed of tines which are supported at their front ends and are free at their rear ends, a tying mechanism arranged adjacent to said comb and opening, and a curved guard mounted on said bar and extending forwardly therefrom and laterally away from the face of said comb.

GEORGE A. FARRALL.
CHRISTIAN MAUL.